Patented June 11, 1940

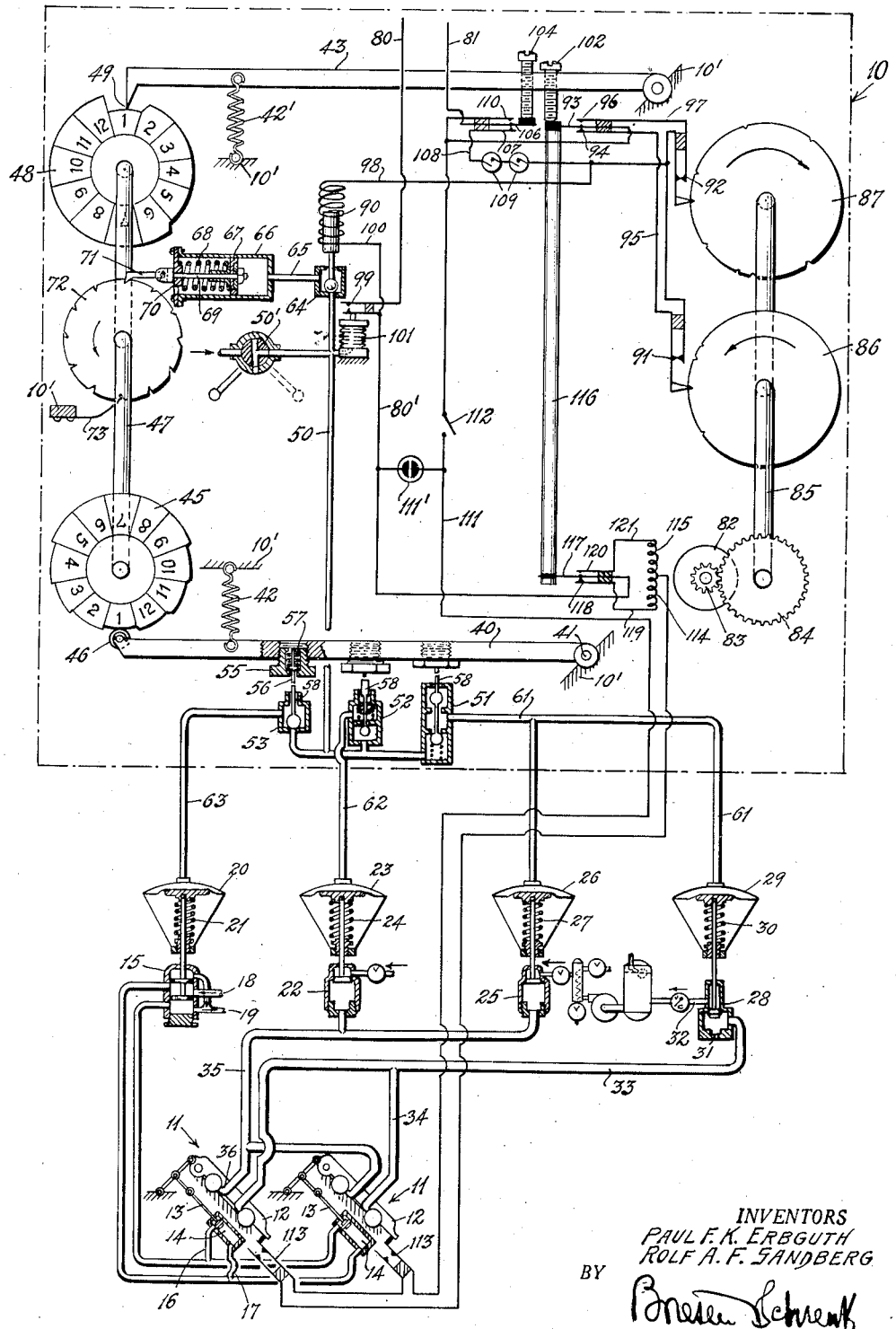

2,204,532

UNITED STATES PATENT OFFICE 2,204,532

PROCESS CONTROL

Paul F. K. Erbguth and Rolf A. F. Sandberg, Brooklyn, N. Y., assignors to Charles J. Tagliabue Mfg. Co., Brooklyn, N. Y., a corporation of New York Application June 7, 1937, Serial No. 146,760

21 Claims. (Cl. 161—7)

This invention relates to timers for safely controlling the cycle of operation of processing devices, such as for example individual vulcanizer presses for hollow tires. It particularly relates to arrangements wherein one such timer controls the operation of two or more such presses. This invention further relates generally to improvements in the cycle controller itself for most flexibly altering the durations of the several steps in the process.

It is a principal object of this invention to provide a cycle controller which, by separating the functions of timing and operation control, can rigidly maintain a predetermined sequence of operations in rapid succession and in which the duration of any such operation may be readily altered. With conventional controllers, inaccuracy of timing is often experienced due to stalling of the timing drive (or to cam slippage) resulting from the excessive load existing where the rider has to climb a steeply rising section of its cam, so that two operations may occur in rapid succession.

In a cycle controller for a particular process, whether for treating tires, phonograph discs, or other processed articles, the operations almost invariably occur in a predetermined sequence. However, in such case, the timing of the various operations is generally subject to unending modification to suit varying characteristics of the material processed so as to obtain the highest efficiency of operation, both as to reduction of the number of "rejects" due to imperfect processing and as to maximum rate of output. In the conventional timer, attempts have been made to solve this problem by the use of adjustable segments, and other surfaces, on a single cam. However, this leaves much to be desired since there still remain, with conventional timers having a variable total duration of cycle, the problems of stopping the timer at the end of each cycle in the proper position for starting the next cycle, and of obtaining short intervals without stalling the clock motor. Both of these problems are advantageously solved in the present invention by separating the functions of controlling and timing and by reversing the timing motor at mid-cycle.

In many processes, a number of pilots, e. g. air-operated valves, must be controlled by the timer. To rapidly displace the required number of air-valves directly by the timer cam, greater demands must be made on the power of the pilot-motor than it can meet. However, in this invention which utilizes the timing cam only to create impulses which cause the operation controlling cam to move forward progressively one step at a time, no undue power demands are made upon the clock-motor of the timer. A further advantage of this invention is the ease with which the time-position of these impulses may be altered. By using circular timing cams of, e. g. 10" circumference, the impulses may be reliably created by notches of the order of 0.010" deep spaced at will on the periphery of such cams. Such notches actuate switches of a type that are positively operated by a displacement of the order of 0.001", the difference in the respective orders being sufficiently large that no difficulty is experienced in obtaining certain and rapid functioning of the timer and at the same time the utmost facility in changing the time for each operation. With a 60 minute cure, the timer cams may turn at a rate of 1 revolution in slightly more than 30 minutes, e. g. in 2,000 seconds, so that the 0.010" notch can be spaced as closely as 0.020", which corresponds with only 4 seconds minimum time between operations. Such rapid operation is commercially most advantageous but unattainable prior to the present invention. With shorter cures or larger cams, the operations may be spaced still more closely.

We also have provided a number of mechanical improvements in such a combination found desirable in reducing it to commercial practice, the objects of which will generally appear from the accompanying disclosure.

We have also provided new methods of, and means for, in this combination, predetermining precisely the duration of each of said operations.

These and other objects of our invention will appear to those skilled in the art from the accompanying drawing and specification, in which is illustrated and described a specific embodiment of our invention. It is our intention to claim all that we have disclosed which is new and useful.

The figure, which is mainly diagrammatic and partly in section, shows the principal electrical, pneumatic, and hydraulic circuits, and their cooperating operative members, the mechanical arrangement being shown especially diagrammatically on the whole.

In the description of this apparatus and its operation of individual vulcanizer presses by way of example, the timer 10 is adapted to control a pair of tire vulcanizing presses 11, each press having a movable mold 12 operable by hydraulic piston 13 in its cylinder 14. The opening and closing ends of hydraulic cylinder 14 are connected with reversing valve 15 therefor by the opening and closing lines 16 and 17, respectively. Hydraulic pressure supply line 18 is connected to this reverse valve, as is its exhaust hydraulic line 19. Reversing valve 15 is positioned by air-operated diaphragm 20 which is opposed by spring 21. Steam supply valve 22 is likewise positioned by its air-operated diaphragm 23 which is opposed by spring 24, this valve being of the spring-closed type, as is also hot water supply valve 25 with its air-operated diaphragm 26, opposed by spring 27. Exhaust valve 28 is air-operated by diaphragm 29 which is opposed by spring 30. This valve is of the 3-way type for selectively connecting the exhaust with drain 31 or with the circulating line 32 connected back to the inlet of hot water valve 25, the exhaust line 33 from the interior of the tires being connected therewith at 34. Inlet line 35 is connected to the interior of the tires at connection 36 to connect steam and hot water valves 22 and 25 with the interior of each of the tires by its inlet connection 36.

Control lever 40 is pivotally mounted on its righthand end on pin 41 which is attached to timer frame 10', the lefthand end being biased upwardly by tension spring 42, the upper end of which is also attached to frame 10'. Switch-operating lever 43 likewise has its righthand end pivotally mounted on frame 10'. Operating cam 45 positions control lever 40 by its coacting roller 46 which is pivotally mounted on the left end of this control lever. Affixed on the same shaft 47 with control cam 45 is switch-operating cam 48. The lefthand end of switch lever 43 has a pointed rider portion 49 which is continuously biased by spring 42' to ride upon the periphery of switch cam 49 in its progressive rotation, shown counterclockwise in the figure. Springs 42 and 42' respectively continuously bias the ends 46 and 49 of levers 40 and 43 towards their respective cams 45 and 49 so that contact is maintained at all times. Thus roller 46 continuously positions control lever 40 according to the then-working edge of cam 45.

Air-supply line 50 contains cock 50', which is normally open. The lower edge of control lever 40 coactingly abuts air-valves 53, 52 and 51 (all connected to this air-supply line 50) respectively for operating the reversing valve 15 for the presses, steam valve 22 and hot water valve 25. An adjustable bumper head 55, having sliding pin 56 biased downwardly by its spring 57, is provided for each of the air-valves so that the lower end of sliding pin 56 may abut the corresponding stem 58 of each air-valves 53, 52 and 51. Air-valve 51 is connected by line 61 to diaphragms 26 and 29 respectively of hot water supply valve 25 and exhaust valve 28, air-valve 51 being of the reverse-acting type so that line 61 is normally disconnected thereby from air-supply line 50 and, when stem 58 of air-valve 51 is depressed, the air-pressure reaches line 61 from air-supply 50. Line 62 connects air-valve 52 with diaphragm 23 of steam valve 22. Line 63 connects air-valve 53 with diaphragm 20 of hydraulic reversing valve 15.

Also connected with air-supply line 50 is the solenoid-operated air-valve 64 which is connected by line 65 with air-cylinder 66 containing piston 67 opposed by spring 68. Piston rod 69 passes through a guide-bearing 70 in the end of cylinder 66 opposite to that to which line 65 is attached. Guide 70 also acts as a bearing for spring 68 and is made skeletal so that atmospheric pressure is on the lefthand face of piston 67. Pawl 71 is attached to rod 69 and arranged to engage the teeth of ratchet wheel 72, which is also affixed to shaft 47 for operating the operation controlling and switch cams 45 and 48 respectively, the friction of rider 49 against the periphery of its switch cam 48, and also that of detent spring 73 (affixed to frame 10'), is relied upon to maintain these cams in their last-set position between operations of the piston operating pawl 71. Ratchet wheel 72 has the same number of notches as the total number N of operations. The stroke of piston 67 and pawl 71 is sufficient to advance the ratchet wheel 72 one step for each operation of piston 67.

Wires 80 and 81 connect the timer to a source of electrical AC supply. In timer 10, an electric motor 82 (preferably of the self-starting synchronous reversible type) drives, through gears 83 and 84, shaft 85, on which are affixed the concentric circular disc cams 86 and 87 respectively for forward and reverse running. The forward running (shown counter-clockwise) corresponds with the first half of the cycle and the reverse (shown clockwise) corresponds with the second half thereof. For a given total number N of operations as heretofore mentioned, the minimum total number of notches on both cams is N+1. All except two notches can be placed on either cam, the remainder being on the other cam. It is necessary, with the particular construction shown in the drawing, to have an extra notch on the reversing cam to act at the same instant with the last notch on the forward cam to avoid an otherwise possible oscillating action of the cam or loss of synchronism at the desired moment of reversal.

The solenoid 90 for solenoid-operated air-valve 64 is connected with switches 91 and 92, which are respectively operated by notches in forward and reverse cams 86 and 87. Line 81 is connectable, by switch blades 106, 107 or 106, 110 as hereinafter explained, to blade 93 of a horizontal double-acting switch so arranged that it contacts lower blade 94, connected with switch 91 by wire 95 when blade 93 is depressed and with upper blade 96, connected with switch 92 by wire 97 when blade 93 is not pushed downwardly, blade 93 being biased upwardly by its own elasticity. Switches 91 and 92 are connected together and with solenoid 90 by wire 98 so as to operate air-valve 64 and piston 67 to advance the ratchet disc 72 one notch each time the then-connected switch 91 or 92 is closed due to the presence of a notch in the periphery of its then-acting forward or reverse cam 86 or 87 respectively. Switch 99 is connected with supply-line 80 and with wire 100 for the other terminal of solenoid 90.

Bellows 101 is connected with air-supply line 50, downstream of its cock 50', and is so disposed adjacent to switch 99 as to close it only while pressure is in the air-line to air-valve 64, switch 99 being adapted to open when not acted upon by bellows 101 due to air-pressure therein. Switch lever 43 has a screw 102 adjusted to abut blade 93 to cause it to contact blade 94 in a lower position (and blade 96 in a higher position). A similar screw 104 is adjusted to a slightly higher elevation. The lower end of screw 104 abuts blade 106 of another two-way switch, blade 106 being shown at the same level as is blade 93 and being likewise connected with supply line 81. When depressed, blade 106 contacts blade 107, which is connected by wire 108 with two push-button switches 109, which are also connected by line 98 with the upper terminal of solenoid 90 for operating air-valve 64.

The arrangement is such that the attendant may initiate the cycle of operation when the timer is in its initial position by simultaneously closing switches 109, thus opening air-valve 64 so that air from line 50 forces piston 67 and its pawl 71 to advance ratchet disc 72 one step, thus turning the switch cam 48 enough to raise rider 49 and switch lever 43 so that blade 106 then contacts "running" blade 110 which is also connected in series with blade 93.

Line 111, containing week-end switch 112 and safety switches 113, is connected with the center of, and is the common lead to, coils 114 and 115 of reversible motor 82 respectively for the forward and reverse running thereof. A neon bulb 111' is continuously connected with line 80', the lower extension of supply line 80 (broken at times by switch 99) and line 111 (below switch 112) so that bulb 111' lights whenever the motor 82 operates.

Blade 93 is mechanically connected by insulating member 116 with blade 117 of a reversing switch, the lower blade 118 of which is connected by wire 119 with the outer end of forward running coil 114, while the upper blade 120 of which is connected by wire 121 with the outer end of coil 115 for the reverse direction of running of motor 82. Blade 117, like blade 93, is likewise biased upwardly by its own elasticity and is disposed relative to blades 118 and 120 respectively in an identical manner as is blade 93 with its blades 94—96. When the blades 93—94 are in contact, blades 117—118 are likewise in contact; and, when blades 93—96 are in contact, blades 117—120 are similarly in contact. Blade 106 is initially in contact with blade 107 so that the two-button-starter 109 will energize solenoid 90 then only to cause the switch cam 48 to move to its second position, which separates blades 106—107 and brings 106—110 into contact so that this two-way switch acts as a running switch.

In case switch 112 is open (as shown), as it would be on a week-end, or during any other period of continued inactivity during which it would be desirable to keep the presses closed but without containing tires, line 111 is broken so that the timer cannot run. In order to again open the presses following such period of inactivity, it is necessary to manually turn operation control cam 45 to its initial position and then close switch 112, after which the presses may be loaded and operation started when the attendant presses both push-buttons 109.

However, since the above method alone might be possibly unsafe, the following method is preferably used. Closing cock 50' will also remove pressure from bellows 101 so that switch 99 opens one side 80 of the supply circuit. In the drawing, cock 50' is shown closed, shutting off the air-supply to the timer, which is then connected to the atmosphere. Since no differential air-pressure then exists across diaphragm 20, its spring 21 raises valve 15 to a press-closing position. Even though both presses 11 are closed and switches 113 are both consequently closed, no part of the timer can operate since switch 99 has been opened by the contracted bellows 101.

In the initial position of the operating and switch cams 45 and 48 respectively, the push-buttons are connected but the presses are both held so that their switches 113, being open, do not permit the timer to operate. In the second position, control levers 40 and 43 are raised slightly so that air-valve 53 operates to cause reverse valve 15 to close the presses; at the same time control lever 43 raises screw 104 so that blade 106 breaks open from blade 107 and contacts 110 so that as soon as both presses close their switches 113, the timer will start in a forward direction. In this second position, blades 93—94 and 117—118 are still in contact so that when the presses close switches 113, motor 83 will operate in a forward direction and switch 91 for forward-running cam 86 will be effective to energize solenoid 90. In the third position; steam is admitted by the operation of air-valve 52. In the fourth position, air-valve 52 again closes off the steam. In the fifth position, the hot water is turned on by its valve 25 controlled by air-valve 51, and at the same time valve 28 changes the exhaust 33 from drain 31 to recirculating line 32 which leads back to valve 25.

In the sixth position, the control lever 40 remains unchanged, but switch lever 43 is raised by its cam 48 so that blade 93 breaks from 94 and contacts blade 96 while blade 117 breaks with 118 and closes with 120, thus causing reverse running of motor 83 and also causing switch 92, for reverse-running cam 87, to become effective. Switch lever 43 remains open for the rest of the cycle until the initial position is reached, when control lever 43 drops to its lowest position thus opening the running switch blades 106 and 110 and connecting, by blades 106 and 107, the push-button switches 109 ready for the next operation. Control lever 40 likewise remains in its position until its tenth position is reached, when the control lever is again raised slightly to operate air-valve 51 to shut off hot water supply-valve 25 and close exhaust valve 28 to shut off exhaust line 33 from circulating line 32 and open it to drain 31. In the elevent position, the control lever rises a little further and operates air-valve 52 to open steam supply valve 22 to blow out the hot water. In the twelfth step, the steam valve is shut off. When the initial step is again reached, control lever 40 rises slightly (or, more strictly, is raised by spring 42, being permitted to rise by the decreased radius of cam 46) to cause air-valve 53 to operate hydraulic reversing valve 15 to cause both presses to open.

From the foregoing it may appear that steps 7, 8 and 9 of the cam are not utilized. These are inserted to show the step flexibility of this method in that additional operations could be performed if it were so desired, e. g. an air-supply valve could be used to blow out the steam, another air-valve or so being readily added to control lever 40 which has ample power. It may be noted that control lever 40 may be hingedly mounted, instead of oscillatably mounted on pin 41, so as to obtain a more nearly equal movement of the lever at the air-valves. Since the order of the movement of such air-valves is generally less than 0.010", it would be desirable in any case to have roller 46 at a greater radius than are the air-valves. In the drawing, the construction is such as to give the required reduction. Similarly, with switch lever 43, the movement of its rider 49 is considerably greater than that of the switches operated thereby, the order of movement of the latter is around 0.001", as earlier stated. In general, the proportions are so chosen as to make the action most positive with reasonable accuracy of workmanship in filing, or otherwise fabricating, the control and switch cams 44 and 45, respectively. Similarly, switches 91 and 92 are operated with a reduced motion as compared with the depth of notches on forward and reverse running cams 86 and 87 respectively.

It is within the scope of our invention to use an electrically operated means, such as an electric motor or solenoid, for progressively moving the control and switch cams a step at a time and to similarly substitute suitable switches for the air-valves progressively operated by a single cam and/or control lever to govern the several steps in the process. Where a number of steps must be made with a very small duration intervening, one skilled in the art would find within our present teachings the use of a plurality of forward and reverse cams effective in sequence or, alternatively, the use of a "phonograph" disc or drum type impulse creating means, capable of being operated in both forward and reverse directions. Also the use of other-than-electrical impulses, e. g. mechanical, fluid-pressure or sound impulses, seem to us to be an equivalent under our invention.

The terms and expressions which we have employed are used as terms of description and not of limitation, and we have no intention, in the use of such terms and expressions, of excluding any equivalents of the features shown and described and portions thereof, but recognize that various modifications are possible within the scope of the invention claimed.

We claim:

1. In a timer for governing the steps in a process, the combination of forward and reverse cam means either cam of which is effective according to the direction of rotation thereof, a reversing motor for operating said means, pilot means for controlling the steps in the process, a member arranged adjacent to said pilot means for actuating them, a pilot governing cam adapted to progressively displace said member away from and back to an initial position to selectively actuate said pilot means, a switch cam, a motor means operatively connected to said pilot governing and switch cams to rotate them in response to the then effective cam of said forward and reverse cam means, and including a solenoid-operable air-valve, manually operable switch means for actuating said solenoid-operable air-valve to cause said motor means to move the said switch and pilot-governing cams to a member-operating position, and switch means, operatively connecting the switch cam with the reversing motor, effective upon such operation of the member to govern the operation of the reversing motor to start and continue the timer upon its cycle of operation.

2. In a timer for governing the steps in a process, the combination of forward and reverse cam means, a reversing motor for driving the same, pilot means operable to govern the steps in the process, a pilot cam for positioning said step-governing pilot means, a switch cam for governing said reversing motor, and an air-motor controlled by said forward and reverse cam means to actuate said pilot and switch cams.

3. In a timer for governing the steps in a process by pilot-operable means, in combination, a reversing motor, impulse-creating means operable thereby, a separate motor operable according to the impulses from said impulse-creating means, pilot means operable to govern the steps in the process, a pilot cam adapted to progressively actuate said pilot means, a switch means including a cam for controlling said reversing motor, both said pilot cam and said switch cam being operable by said separate motor, and said pilot means and switch means being arranged to be actuated respectively by said pilot and switch cams to give a predetermined sequence of operation of said pilot-operable means.

4. In a timer for governing the steps in a process, in combination, a reversing motor, contact-governing means including contacts operable thereby, a separate motor operable according to the positions of the contacts of said means, pilot means, pilot-operable process governing means, a pilot cam adapted to progressively actuate said pilot means, a switch cam for controlling said reversing motor, switch means operable by said switch cam to control the direction of motion of said reversing motor, said pilot cam and said switch cam being operable by said separate motor, and said pilot means being adapted and arranged relative to said pilot cam to be selectively actuatable by a progressive movement thereof to give a predetermined sequence of operation of said pilot-operable process-governing means.

5. In a timer for governing the steps in a process, the combination of reversible running timing cam means having a forward and a reverse cam and including a timing switch for each cam element thereof, a reversing motor for driving the same; a pilot cam and a switch cam; pilot-governed means for controlling the process, pilot means therefor and actuable by said pilot cam; an air supply, an air-operated motor adapted to actuate said pilot and switch cams progressively step-by-step in one direction, a solenoid, an air-valve operated by said solenoid and connected to said air supply and to said air-operated motor; a manually-operable starting switch; directional timing switch means actuated by said switch cam to selectively operatively connect said solenoid with said forward or reverse timing switch according to the then direction of rotation of said cam means, switch means including a running switch actuated by said switch cam to selectively operatively connect said starting switch initially with said solenoid so that the manual operation of said starting switch causes said pilot cam to advance to a pilot-governed means actuating position and to subsequently disconnect said starting switch from and to operatively connect said directional timing switch means with said solenoid so that said pilot cam is caused to advance thereafter during the cycle according to the then effective element of said timing switches, and switch means also actuated by said switch cam and connected to said reversing motor for determining the running direction thereof; and switch means controlled by said pilot-governed means to start said reversing motor, said running switch being controlled by said switch cam to cause the timer to complete its cycle of operation and stop with both said pilot cam and said forward and reverse running cam means in their respective initial positions.

6. In a cycle timer, the combination of pilot means, automatic switch means, unitary cam means for actuating both of said means, motor means for operating said unitary cam means, a timing cam telemetrically connected to said motor means to govern the actuation thereof, a motor for driving said timing cam and connected to a portion of said automatic switch means to be controlled thereby, starting switch means, and a circuit connecting said unitary cam means operating motor means with said automatic and said starting switch means, such circuit and such connected means being adapted and arranged to selectively connect the unitary cam means operating motor means with the starting switch means at the initial position of said switch-actuating cam means and with the automatic switch means in other positions of such cam means.

7. In a cycle timer, the combination of pilot means, automatic switch means, unitary cam means for actuating both of said means, motor means for operating said cam means, timing cam means telemetrically connected to said motor means to govern the actuation thereof, a reversible motor for driving said timing cam means in either a forward or reverse direction and connected to a portion of said automatic switch means to be controlled thereby both as to its running direction and duration, starting switch means, and a circuit connecting said unitary cam means operating motor means with said automatic and said starting switch means, such circuit and its connected means being adapted and arranged to selectively connect the unitary cam means operating motor means with the starting switch means at the initial position of said switch-actuating cam means and with the automatic switch means in other positions of such cam means.

8. In combination, a pilot actuator operable according to impulses, a plurality of integral forward and reverse running cam means connected therewith, a reversible motor for driving said integral cam means, switch means coacting with said integral cam means for transmitting impulses to said pilot actuator, and switch means operatively connecting said reversible motor with said actuator so that the direction of running of said motor is governed by said actuator, each of said integral cam means having an impulse-creating portion and said portions arranged to be substantially simultaneously effective at the instant of reversal.

9. In a timer for sequentially operating means for controlling a process through a cycle, the combination of a reversible timing means moving during each cycle in each of opposite directions for governing the controlling means according to its then-direction of motion, a separately-driven actuator for said controlling means and governed by said timing means to be progressively movable through a closed cycle, and means actuated by said actuator for causing reversal of the timing means at a time predetermined by the latter, the timing means and the actuator being constructed and arranged relative to the actuated means to attain their initial positions at the end of the cycle.

10. In a timer for sequentially operating means for controlling a process through a cycle, the combination of a reversible timing means including an electric motor and for creating impulses at predetermined times and according to the then-direction of motion of the timing means, a running-switch for said electric motor, an actuator including a separate motor for moving it progressively by steps through a closed cycle and connected to the timing means to be advanced a step with each impulse from the latter and also connected to said running-switch to close said switch upon taking at least one step from the initial position of the actuator, a manually operable means for causing the actuating means motor to advance the actuating means to a running-switch closing position, and means actuated by said actuator for causing reversal of the timing means during the cycle at a predetermined time, said actuated means being constructed to open the running switch when the actuator has been returned to its initial position and said timing means being so constructed that it is also then at its initial position.

11. In a timer for sequentially operating power means for controlling a process through a cycle, the combination of a plurality of pilots for governing the power means, a member progressively movable relative to said pilots, said pilots and said member being constructed and arranged to govern the operation of the process in a predetermined manner upon a progressive and reversible movement of the member through a series of steps, a timing means including a constant speed motor, an actuator for said member, said actuator including a motor which is separate from that of the timing means and adapted to powerfully and suddenly advance the actuator through steps corresponding with those of said member, said timing means and said actuator being so constructed and arranged that a steady movement of the timing means causes a repeated operation of said actuator motor and a stepping action of the actuator for abruptly actuating the pilots at predetermined times without interference with the movement of the timing means to govern the process in the predetermined manner.

12. In a timer for sequentially operating means for controlling processing conditions through a cycle, the combination of pilot means for governing the process-controlling means, timing means including a constant speed motor, an actuator for said pilot means including a motor separate from that for said timing means and controlled by said timing means, manually operable means for causing the advance of the actuator to a position thereof which affects one of the processing conditions, a means associated with the process and sensitive to such condition, means for starting the timer in accordance with the response of the condition-sensitive means to a change of said condition, said timing means being operatively connected with said actuator to move the latter in a manner predetermined by the timing means from and to an initial position during the cycle, and means for stopping the timing means upon the return of the actuator to the initial position thereof.

13. In a timer for governing the steps in a process, the combination with forward and reverse timing-cam means effective selectively according to the direction of motion of the cam elements thereof, and a reversing motor for driving said cam means in each of opposite directions; of a process-governing cam, switch means for governing the reversing motor, and motor means governed by the then-effective cam of the timing-cam means for actuating the process-governing cam and the switch means.

14. In a timer for governing the steps of a process during a cycle, the combination with impulse-creating means including a portion operative during the cycle in each of opposite directions, and a reversing motor for operating said means; of a process-governing cam, switch means for governing the operation of said motor, motor means governed by the impulses from the first named means for actuating the process-governing cam and the switch means, and means operatively connected with the switch means for initiating the operation of the reversing motor.

15. In a timer for governing means for controlling the steps of a process during a cycle, the combination of forward and reverse cam means, and a motor means for operating said cam means in each of opposite directions during the cycle, pilot means for the process-controlling means, a governing cam for actuating said pilot means, means including and operable by a switch cam for governing the reversal of the forward and reverse cam means, a separate motor means for operating said governing cam and said switch cam in accordance with the position and the direction of motion of the first named cam means, and manually-operable means for starting the cycle and connectable by a portion of the means operable by the switch cam with the last named motor means for causing the operation of the switch-cam to a position which initiates a cycle.

16. In a timer, in combination, reversible cam means and contact-governing means operated thereby, a reversing motor for driving said cam means, a switch electrically connected to said reversing motor for governing the direction of rotation thereof, a separate motor governed by said contact-governing means, and means actuatable by the last named motor to operate said switch.

17. In a timer for governing means for controlling the steps in a process through a cycle, in combination, a reversing motor and two contact-governing means including contacts operable thereby; a separate motor, pilot means and a pilot cam operable by the second named motor for actuating said pilot means, and switch means including a switch cam also operable by the second named motor and having portions for controlling the direction of running of said reversing motor and for selectively connecting one of said contact-governing means for each direction of running with the second named motor to govern the same; all constructed and arranged to cause the progressive actuation of the switch and pilot cams at times predetermined by said contact-governing means and the pilot cam and pilot means being mutually adapted to give a predetermined sequence of operation of said pilot-operated means upon such progressive actuation of said pilot cam.

18. In a timer for governing air-operated means for cyclically controlling steps in a process, the combination of forward and reverse running circular cams having notches on the peripheries thereof, a reversing motor for driving said cams, air-valve pilot means for governing the actuation of said air-operated means, a pilot cam for positioning said pilot means and a switch cam for governing said reversing motor, means selectively responsive to the positions of the notches on said circular cams according to the direction of running thereof to position said pilot cam and said switch cam, and an independent means for initiating a cycle of operation of said timer.

19. In a timer for governing pilot-actuable means for cyclically controlling steps in a process, the combination of a reversing motor; contact-governing means including a switch operated by said motor for making contact-impulses; a separate motor whose actuation is governed by said contact-impulses; pilot means for governing the actuation of said pilot-actuable means in dependence upon the position of said pilot means; a pilot cam for positioning said pilot means and a switch cam, both of said cams being operated by said separate motor; and two switch means for governing said reversing motor, one of said switch means being operated by said switch cam to determine the direction of running of said reversing motor and the other of said switch means functioning upon the operation of said pilot-actuable means for starting the running of said reversing motor.

20. In a timer for governing pilot-actuable means for cyclically controlling steps in a process, the combination of a reversing motor; contact-governing means including a switch operated by said motor for making contact-impulses; a separate motor whose actuation is governed by said contact-impulses; pilot means for governing the actuation of said pilot-actuable means in dependence upon the position of said pilot means; a pilot cam for positioning said pilot means and a switch cam, both of said cams being operated by said separate motor; a switch means operated by said switch cam to determine the direction of running of said reversing motor; and means for initiating the cycle of operation of said timer.

21. In a timer for sequentially operating means for controlling a process through a cycle, the combination of a reversible timing means for creating impulses at predetermined times and according to its then direction of motion, driving means for said timing means, an actuator for the controlling means progressively movable in a step by step manner through a closed cycle, a second driving means responsive to said impulses for driving said actuator with an advance of a step for each impulse, and means actuated by said actuator for causing reversal of said timing means during the cycle at a time determined by the timing means.

PAUL F. K. ERBGUTH.
ROLF A. F. SANDBERG.